United States Patent
Bang et al.

(10) Patent No.: US 7,866,833 B2
(45) Date of Patent: Jan. 11, 2011

(54) APPARATUS AND METHOD FOR PROJECTING IMAGE CONSIDERING SCREEN CONDITION

(75) Inventors: Yousun Bang, Suwon-si (KR); Han Bing, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 679 days.

(21) Appl. No.: 11/882,727

(22) Filed: Aug. 3, 2007

(65) Prior Publication Data

US 2008/0137039 A1 Jun. 12, 2008

(30) Foreign Application Priority Data

Dec. 11, 2006 (KR) ...................... 10-2006-0125653

(51) Int. Cl.
*G03B 21/14* (2006.01)

(52) U.S. Cl. ..................... 353/121; 353/122; 345/600

(58) Field of Classification Search ................. 353/121, 353/122; 345/600, 207, 590, 591, 592
See application file for complete search history.

(56) References Cited

U.S. PATENT DOCUMENTS

| 6,715,889 B2 * | 4/2004 | Nishima et al. | ............. 353/122 |
| 7,339,596 B2 * | 3/2008 | Tajima | ............. 353/122 |

FOREIGN PATENT DOCUMENTS

| JP | 2003-333611 | 11/2003 |
| JP | 2004-72760 | 3/2004 |
| JP | 2004-229290 | 8/2004 |
| JP | 2005-195617 | 7/2005 |

* cited by examiner

*Primary Examiner*—Seung C Sohn
(74) *Attorney, Agent, or Firm*—Staas & Halsey LLP

(57) ABSTRACT

Disclosed are an apparatus and method for projecting images to prevent the distortion of images when images are projected on a colored projection screen. The apparatus includes a device characteristic storage unit storing criterion projection characteristic information obtained when white light, black light and colored light are projected onto a criterion projection screen, a first image converter to convert received images into processed images by reflecting criterion projection characteristic information to received images, an image characteristic obtaining unit to obtain object projection characteristic information by projecting white light and black light onto an object projection screen, an image improvement unit to convert processed images into improved images by reflecting object projection characteristic information to processed images, and a second image converter to convert improved images into output images by reflecting criterion projection characteristic information and object projection characteristic information to improved images.

20 Claims, 9 Drawing Sheets

APPARATUS AND METHOD FOR PROJECTING IMAGE CONSIDERING SCREEN CONDITION

CROSS-REFERENCE TO RELATED APPLICATION

This application claims priority from Korean Patent Application No. 10-2006-0125653 filed on Dec. 11, 2006 in the Korean Intellectual Property Office, the disclosure of which is incorporated herein by reference in its entirety.

BACKGROUND OF THE INVENTION

1. Field of the Invention

The present invention relates to an apparatus and method for projecting images, and more particularly to an apparatus and method for projecting images in consideration of a screen condition.

2. Description of the Prior Art

Generally, a conventional projector is set at a preferable place in an office, a conference room, or at home, and projects images on a dedicated screen prepared for the projector.

Recently, with development of micro-technologies, projectors having a reduced size have been implemented, and can be adapted to a portable terminal or a laptop computer by applying an optical modulator or a micro mirror to the projectors. However, as these small-sized projectors are carried by users, it is difficult to secure a clear screen.

Therefore, in order to use the projector at a desired place regardless of a screen, a projector reflecting a screen condition is required and the necessity for the projector increases.

SUMMARY OF THE INVENTION

Accordingly, the present invention has been made to solve the above-mentioned problems occurring in the prior art, and it is an object of the present invention to provide an apparatus and method for projecting images, which can obtain and analyze information on a colorful screen, thereby preventing projected images from being distorted by colors of the screen.

The object of the present invention is not limited to that stated above. Those of ordinary skill in the art will clearly recognize other objects in view of the following description of the present invention.

In order to accomplish the object of the present invention, according to an aspect of the present invention, there is provided an apparatus for projecting images in consideration of screen condition, which includes: a device characteristic storage unit storing criterion projection characteristic information to be obtained when white light, black light and colored light are projected onto a criterion projection screen; a first image converter reflecting the criterion projection characteristic information to received images so as to covert the received images into processed images; an image characteristic obtaining unit projecting the white light and black light onto an object projection screen so as to obtain object projection characteristic information; an image improvement unit reflecting the object projection characteristic information to the processed images so as to convert the processed images into the improved images; and a second image converter reflecting the criterion projection characteristic information and the object projection characteristic information to the improved images so as to convert the improved images into the output images.

In order to accomplish the object of the present invention, according to an aspect of the present invention, there is provided a method of projecting images in consideration of a projection screen, which includes: reflecting obtained criterion projection characteristic information to received images, so as to convert the received images into processed images when white light, black light and colored light are projected on a criterion projection screen; projecting the white light and black light on an object projection screen, so as to obtain object projection characteristic information; reflecting the object projection characteristic information to the processed images, so as to convert the processed images into improved images; and reflecting the criterion projection characteristic information and the object projection characteristic information to the improved images, so as to convert the improved images into output images.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the preferred embodiment of the present invention will be described in detail with reference to the accompanying drawings.

Figure 1:
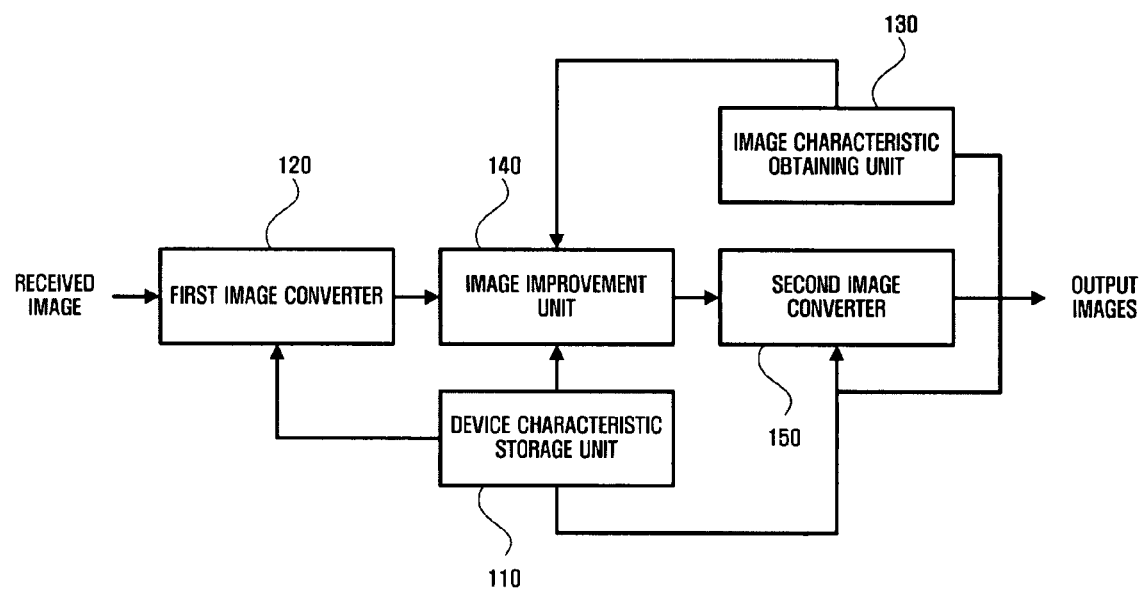
FIG. 1 is a block diagram illustrating an apparatus for projecting images with corrected colors according to the first embodiment of the present invention.

FIG. 1 is a block diagram illustrating an apparatus for projecting images with corrected color according to the embodiment of the present invention, in considering a screen condition. The apparatus for projecting images according to the present invention considering a screen condition includes a storage unit 110 for storing a device characteristic, a first image converter 120, an image characteristic obtaining unit 130, an image improvement unit 140, and a second image converter 150.

The storage unit 110 for storing the device characteristic plays the role of storing information on a criterion projection characteristic obtained when white light, black light, and colored light are projected on a criterion screen.

Here, the information on the criterion projection characteristic may includes at least one of equalization coordinate information on a criterion white point, which is $(x_w, y_w)$, a criterion black light coordinate information, which is $$\begin{pmatrix} X \\ Y \\ Z \end{pmatrix}_{\substack{Black \\ White \\ Screen}},$$

criterion color matrix information, which is $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen},$$

matrix information on device color characteristic, which is $$\begin{pmatrix} \frac{x_r}{y_r} & \frac{x_g}{y} & \frac{x_b}{y_b} \\ 1 & 1 & 1 \\ \frac{z_r}{y_r} & \frac{z_g}{y_g} & \frac{z_b}{y_b} \end{pmatrix}_{projector},$$

and criterion luminance information $L_s$.

Further, $(x_w, y_w)$ is a coordinate value of an equalized white point when white light is projected onto the screen, and $$\begin{pmatrix} X \\ Y \\ Z \end{pmatrix}_{\substack{Black \\ White \\ Screen}}$$

is a XYZ coordinate value of a color space when black light is projected onto the screen. Meanwhile, $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen}$$

is a matrix with respect to the maximum coordinate value of red light in the XYZ color space, the maximum coordinate value of blue light in the XYZ color space, and the maximum coordinate value of green light in the XYZ color when the red light, blue light and green light with different intensities are projected onto a criterion screen.

$$\begin{pmatrix} \frac{x_r}{y_r} & \frac{x_g}{y} & \frac{x_b}{y_b} \\ 1 & 1 & 1 \\ \frac{z_r}{y_r} & \frac{z_g}{y_g} & \frac{z_b}{y_b} \end{pmatrix}_{projector}$$

is obtained by measuring colors, and is a color characteristic matrix depending on a device, and Ls may be the luminance obtained when the white light is projected on a criterion screen.

Further, the criterion color matrix information may include, as its structural components, XYZ coordinate values of primary colors which have the maximum value of tone curve by interpolating values of the primary colors after the values of the primary colors are obtained by reflecting various images with different intensities.

The first image converter 120 receives input images and criterion projection characteristic information from the device characteristic storage unit 110, and then converts the input images into processed images by reflecting the received criterion projection characteristic information.

Here, the detailed role of the first image converter 120 will be described with reference to FIG. 2.

The image characteristic obtaining unit 130 projects white light and black light onto an object screen to obtain the object projection characteristic information on the object screen.

Here, the object projection characteristic information on the screen may include at least one of object white point equalization coordinate information $(x_w, y_w)$, coordinate information of object white light in a standard color space $$\begin{pmatrix} X \\ Y \\ Z \end{pmatrix}_{\substack{White \\ color \\ wall}},$$

coordinate information of object black light in a standard color space $$\begin{pmatrix} X \\ Y \\ Z \end{pmatrix}_{\substack{Black \\ color \\ wall}},$$

and object luminance information $L_c$.

Further, $(x_w, y_w)$ may be an equalization coordinate value of the white point obtained by projecting the white color onto the object screen, and $$\begin{pmatrix} X \\ Y \\ Z \end{pmatrix}_{\substack{White \\ color \\ wall}}$$

may be the coordinate value of the standard color space obtained by projecting the white light onto the object screen. In addition, $$\begin{pmatrix} X \\ Y \\ Z \end{pmatrix}_{\substack{Black \\ color \\ wall}}$$

may be the coordinate value of the standard color space obtained by projecting the black light, and $L_c$ may be the luminance information obtained by projecting the white light onto the object screen.

Here, the image characteristic obtaining unit 130 may include a projection image generator (not shown) and a projection image sensor (not shown). The projection image generator may be an image projector considering a projection screen, or a separate image signal generator.

The image improvement unit 140 receives the object projection characteristic information from the image characteristic obtaining unit 130 while receiving the processed images from the first image converter 110. Then, the image improvement unit 140 reflects the received object projection characteristic information so as to convert the processed images into the improved images.

Hereinafter, the detailed role of the image improvement unit 140 will be described with reference to FIG. 3.

The second image converter 150 receives the improved images from the image improvement unit 140, the criterion projection characteristic information from the device characteristic storage unit, and the object projection characteristic information from the image characteristic obtaining unit 130. Then, the second image converter 150 reflects the received criterion projection characteristic information and the object projection characteristic information so as to convert the improved images into images to be output.

The detailed role of the second image converter 150 will be described with reference to FIG. 4 below.

Figure 2:
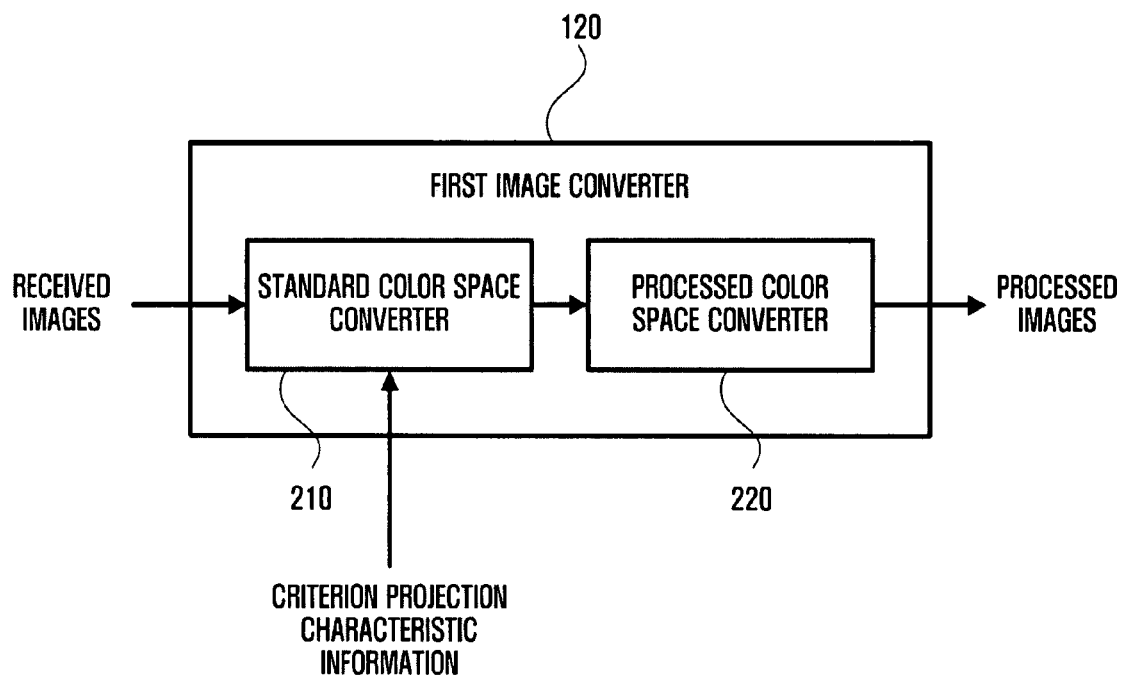
FIG. 2 is a block diagram illustrating the first image converter shown in FIG. 1.

FIG. 2 is a block diagram illustrating the first image converter shown in FIG. 1. The image projector considering a screen condition according to the present invention includes a standard color space converter 210 and a processed color space converter 220.

The standard color space converter 210 receives input images and criterion projection characteristic information from the device characteristic storage unit 110. Then, the standard color space converter 210 reflects the received criterion projection characteristic information so as to convert the input images into standard images.

Here, the color space converter 210 receives the input images while receiving criterion black light coordinate information and criterion color matrix information from the device characteristic storage unit 110. Then, the color space converter 210 substitutes $$\begin{pmatrix} X \\ Y \\ Z \end{pmatrix} = \begin{pmatrix} X \\ Y \\ Z \end{pmatrix}_{Black} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white \atop screen} \begin{pmatrix} R \\ G \\ B \end{pmatrix}$$

with the received criterion black light coordinate information and the criterion color matrix information, so as to convert the input images into the standard images.

Here, $$\begin{pmatrix} X \\ Y \\ Z \end{pmatrix}$$

may be a coordinate value of XYZ color space in the standard images, and $$\begin{pmatrix} R \\ G \\ B \end{pmatrix}$$

be a coordinate value of RGB color space in the input images.

The processed color space converter 220 receives the standard images from the standard color space converter 210 and converts the received standard images into the processed images.

Figure 3:
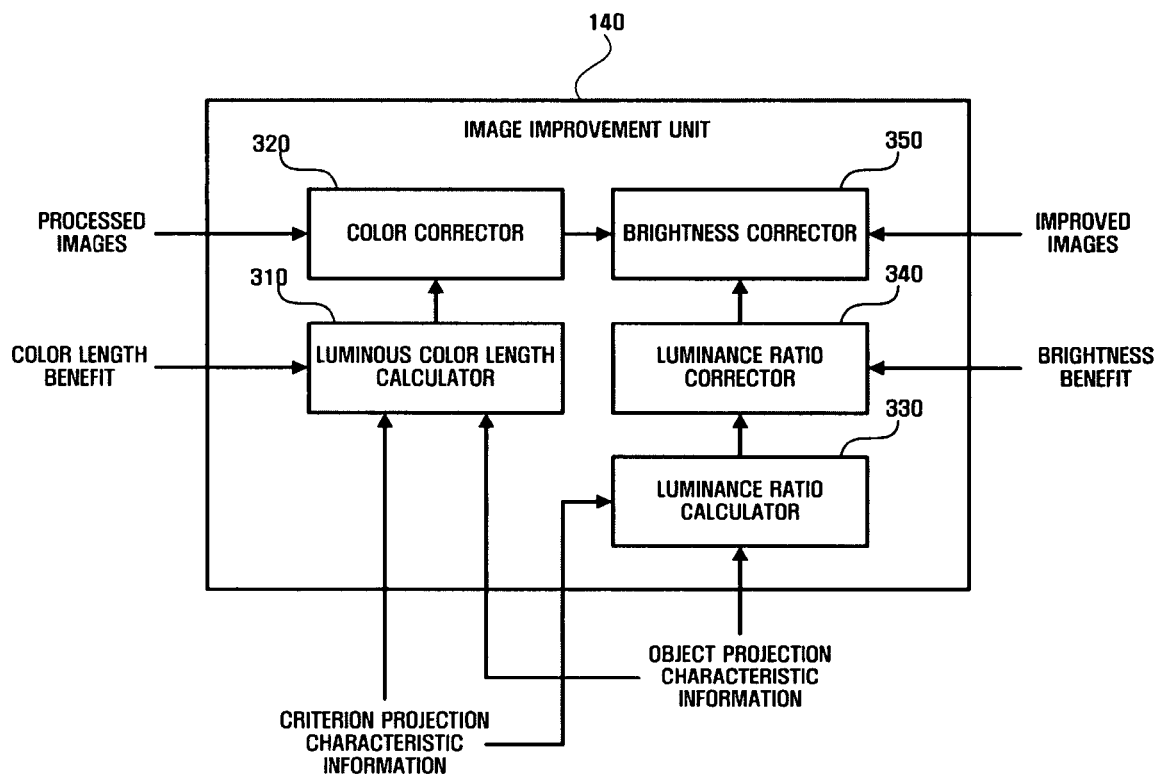
FIG. 3 is a block diagram illustrating an image improvement unit shown in FIG. 1.

FIG. 3 is a block diagram illustrating the image improvement unit shown in FIG. 1. The image projector considering a screen condition according to the present invention includes a luminous calculator 310, a color corrector 320, a luminance ratio calculator 330, a luminance ratio corrector 340, and a brightness corrector 350.

The luminous calculator 310 receives the criterion projection characteristic from the device characteristic storage unit 110, the object projection characteristic information from the image characteristic obtaining unit 130, and a desired color length benefit, and then calculates a luminous length by reflecting the received criterion projection characteristic information, the projection characteristic information, and the color length benefit.

Further, the color length calculator 310 receives the criterion white point equalization coordinate information from the device characteristic storage unit 110, the object white point equalization coordinate information from the image characteristic obtaining unit 130, and a desired color length benefit, and then substitutes $x'_{wc}=A(x_{wc}-x_w)$, $y'_{wc}=A(y_{wc}-y_w)+y_w$ with the received criterion white point equalization coordinate information, the object white point equalization coordinate information, and the color length benefit so as to calculate the luminous color length expressed by $(x'_{wc}, y'_{wc})$.

Here, the desired color length benefit is a real number which is no less than zero and no greater than one, and may be a benefit based on user's luminous recognition, which can be obtained even if a person skilled in the art performs an inordinate experiment.

The color correction unit 320 receives the luminous color length from the luminous color length calculator 310 and the processed images from the first image converter 120, and then reflects the received luminous color length so as to converter the processed images into the color correction images.

The luminance ration calculator 330 receives the criterion projection characteristic information from the device characteristic storage unit 110 and the object projection characteristic information from the image characteristic obtaining unit 130, and reflects the criterion projection characteristic information and the object projection characteristic information so as to calculate the luminance ratio.

Here, the luminance ratio calculator 330 receives the criterion luminance information form the device characteristic storage unit 110 and the object luminance information from the image characteristic obtaining unit 130, and then calculates the ratio of the received criterion luminance information to the object luminance information, resulting in obtainment of the luminance ratio.

The luminance corrector 340 receives the luminance ratio from the luminance ratio calculator 330 and receives any one B of a user's favorite brightness benefit, which is input by a user, and a selected brightness benefit, and then substitutes $$x_c = B\frac{L_s}{L_c}$$

with the input brightness benefit and the luminance ratio so as to obtain the corrected luminance ratio, expressed by $x_c$.

In addition, the favorite brightness benefit is a profile suitable for certain image contents or is manually adjusted in each step. The selected brightness benefit may be a value predetermined in a factory. However, it is not limited to the value.

The brightness corrector 350 receives a corrected luminance ratio from the luminance ratio corrector 340 and color-corrected images from the color corrector 320, and then reflects the corrected luminance ratio so as to convert the color corrected images into the improved images.

Here, the brightness corrector 350 receives the corrected luminance ratio from the luminance corrector 340 and the color-corrected images, in which the luminance element is $J_{in}$, from the color corrector 320, and then reflects the corrected luminance ratio so as to convert the color corrected images into the improved images each of which the luminance element is $$J_{out} = \begin{cases} \dfrac{x_c + J_2}{J_1} J_{in}, & \text{if } J_{in} \leq J_1 \\ \dfrac{100 - (x_c + J_2)}{100 - J_1}(J_{in} - 100) + 100, & \text{if } J_{in} > J_1 \end{cases}.$$

Figure 4:
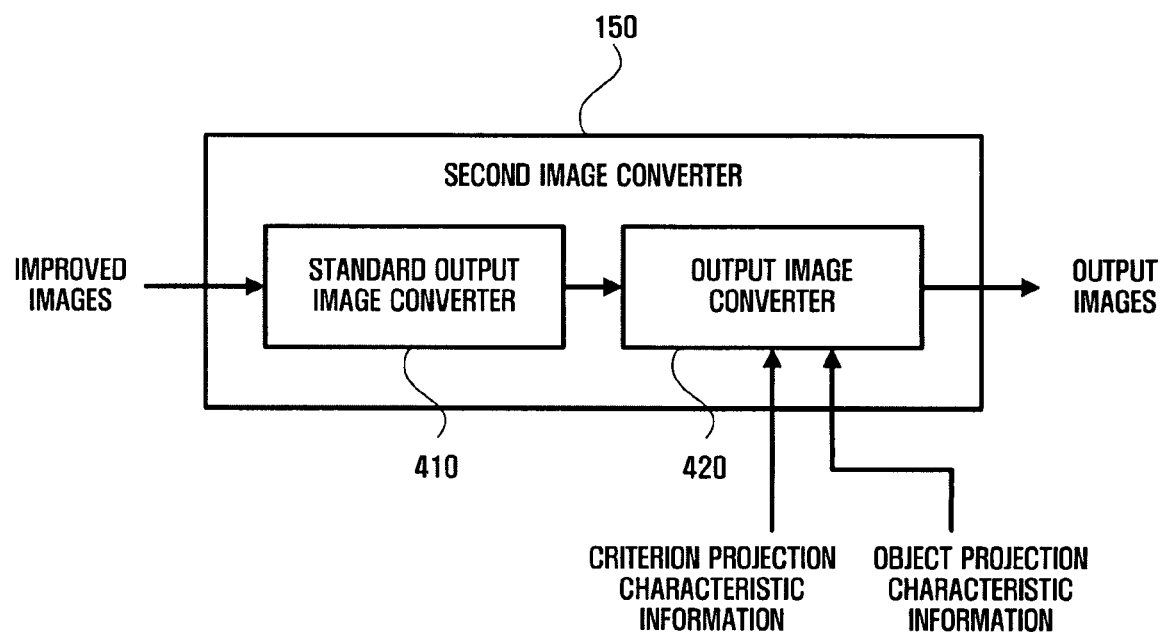
FIG. 4 is a block diagram illustrating the second image converter shown in FIG. 1.

FIG. 4 is a block diagram illustrating the second image converter shown in FIG. 1. The image projector considering a projection screen according to the present invention includes a standard output image converter 410 and an output image converter 420.

The standard output image converter 410 receives the improved images from the image improvement unit 140, and converts the improved images into the standard output images.

The standard output image converter 410 receives the standard output images from the image improvement unit 140, criterion projection characteristic information from the device characteristic storage unit 110, and object projection characteristic information from the image characteristic obtaining unit 130, and then reflects the criterion projection characteristic information and the object projection characteristic information, which are received, to convert the standard output images into the output images.

Here, the output image converter 420 receives the standard output images from the standard output image converter 410, the device color characteristic matrix information from the device characteristic storage unit 110, and the object white light standard color space coordinate information and the object black light standard color space coordinate information. Then, the output image converter 420 substitutes $$\begin{pmatrix} X \\ Y \\ Z \end{pmatrix}_{\substack{White \\ color \\ wall}} = \begin{pmatrix} X \\ Y \\ Z \end{pmatrix}_{\substack{Black \\ color \\ wall}} + \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r \\ I_g \\ I_b \end{pmatrix}_{\substack{color \\ wall}}$$

with the device color characteristic matrix information, the object white light standard color space coordinate information, and the object white light standard color space coordinate information, which are received, and obtains coordinate values of intensity of the primary colors expressed by $$\begin{pmatrix} I_r \\ I_g \\ I_b \end{pmatrix}_{\substack{color \\ wall}}.$$

Sequentially, the output image converter 420 substitutes $$\begin{pmatrix} X_{R,max} & X_{G,max} & X_{B,max} \\ Y_{R,max} & Y_{G,max} & Y_{G,max} \\ Z_{R,max} & Z_{G,max} & Z_{G,max} \end{pmatrix}_{\substack{color \\ wall}} = \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r & 1 & 1 \\ 1 & I_g & 1 \\ 1 & 1 & I_b \end{pmatrix}_{\substack{color \\ wall}}$$

with the coordinate value of intensity of the primary colors and the color characteristic matrix information, and obtains the object color matrix information. Further, the output image converter 420 substitutes $$\begin{pmatrix} X \\ Y \\ Z \end{pmatrix} = \begin{pmatrix} X \\ Y \\ Z \end{pmatrix}_{\substack{Black \\ color \\ wall}} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}} \begin{pmatrix} R' \\ G' \\ B' \end{pmatrix}$$

with the object color matrix information so as to convert the standard output images into the output images.

Figure 5:
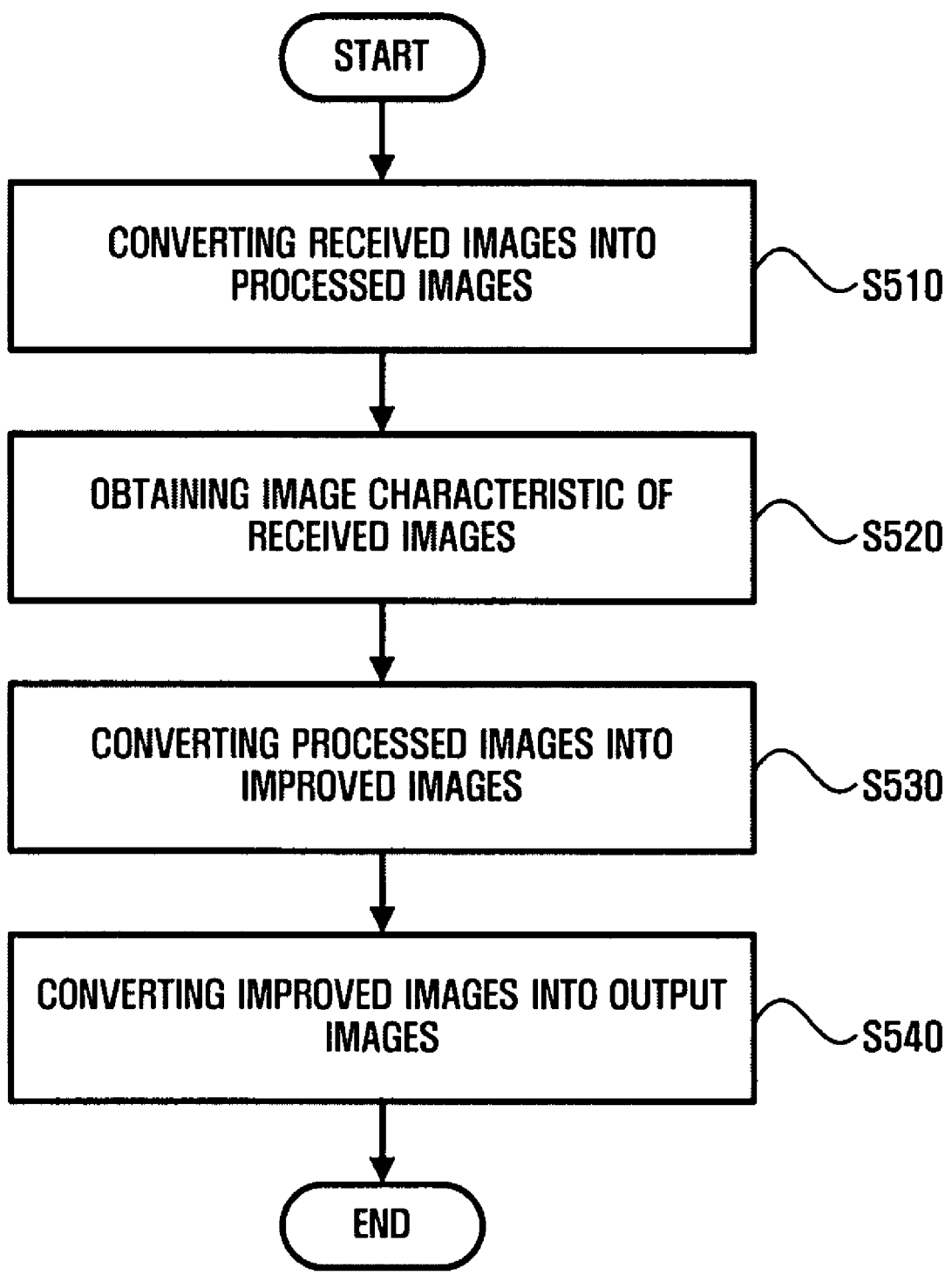
FIG. 5 is a flowchart illustrating a method for projecting images with corrected colors according to the embodiment of the present invention.

FIG. 5 is a flowchart illustrating the image projector considering a screen condition according to an embodiment of the present invention. A method for projecting images using the image projector considering the screen condition according to the present invention will be described with reference to FIG. 1 below.

First, the first image converter 120 receives the input images, and the criterion projection characteristic information from the device characteristic storage unit 110. Then, the first image converter 120 reflects the received criterion projection characteristic information so as to convert the input images into the processed image (S510).

Here, the criterion projection characteristic information may be any one of criterion white point equalization coordinate information, which is $(x_w, y_w)$, criterion black color coordinate information, which is $$\begin{pmatrix} X \\ Y \\ Z \end{pmatrix}_{\substack{Black \\ White \\ screen}}$$

criterion color matrix information, which is $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}},$$

device color characteristic matrix information which is $$\begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector},$$

and criterion luminance information $L_s$.

Here, $(x_w, y_w)$ is the coordinate value of the equalized white point when the white light is projected onto a criterion projection screen, and $$\begin{pmatrix} X \\ Y \\ Z \end{pmatrix}_{\substack{Black \\ White \\ screen}}$$

is the coordinate value of the XYZ color space when the black light is projected onto a criterion projection screen. Meanwhile, $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}}$$

are the coordinate values of the XYZ color spaces of red light, blue light and green light when the red light, blue light, and green light with different intensities are alternately projected onto a criterion projection screen, and $$\begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector}$$

is the color characteristic matrix depending on a device, which is obtained by measuring the colors. $L_s$ is the luminance value to be obtained when the white light is projected onto the criterion projection screen.

Next, the image characteristic obtaining unit 130 projects the white light and the black light on the object projection screen so as to obtain the object projection characteristic information (S520).

Here, the object projection characteristic information may include at least one of object white point equalization coordinate information, which is $(x_{wc}, y_{wc})$, object white light standard color space coordinate information, which is $$\begin{pmatrix} X \\ Y \\ Z \end{pmatrix}_{\substack{White \\ color \\ wall}},$$

object black light standard color space coordinate information, which is $$\begin{pmatrix} X \\ Y \\ Z \end{pmatrix}_{\substack{Black \\ color \\ wall}},$$

and object luminance information, which is $L_c$.

Meanwhile, $(x_{wc}, y_{wc})$ may be the equalized value of the coordinate value of the white point to be obtained when the white light is projected onto the object projection screen, $$\begin{pmatrix} X \\ Y \\ Z \end{pmatrix}_{\substack{White \\ color \\ wall}}$$

may be the standard color coordinate value to be obtained when the white light is projected onto the object projection screen, $$\begin{pmatrix} X \\ Y \\ Z \end{pmatrix}_{\substack{Black \\ color \\ wall}}$$

may be the standard color coordinate value to be obtained when the black light is projected onto the object projection screen, and $L_c$ may be the luminance information to be obtained when the white light is projected onto the object projection screen.

Then, the image improvement unit 140 receives the object projection characteristic information from the image characteristic obtaining unit 130 and the processed images from the first image converter 120, which in turn reflects the received object projection characteristic information so as to convert the processed images into the improved images (S530).

Next, the second image converter 150 receives the improved images from the image improvement unit 140, the criterion projection characteristic information from the device characteristic storage unit 110, and the object projection characteristic information from the image characteristic obtaining unit 130, and then reflects the criterion projection characteristic information and the object projection characteristic information, which are received, so as to convert the improved images into the output images (S540).

Figure 6:
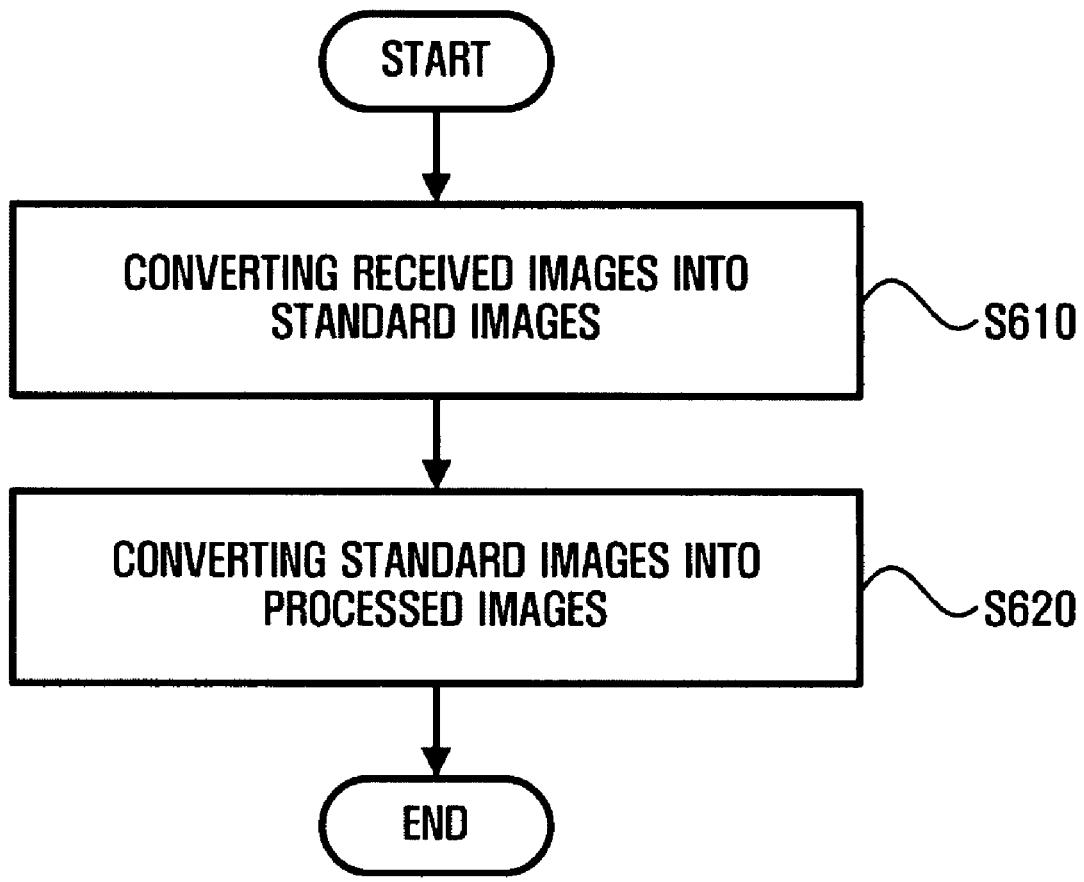
FIG. 6 is a flowchart illustrating a step S510 in FIG. 5.
Figure 7:
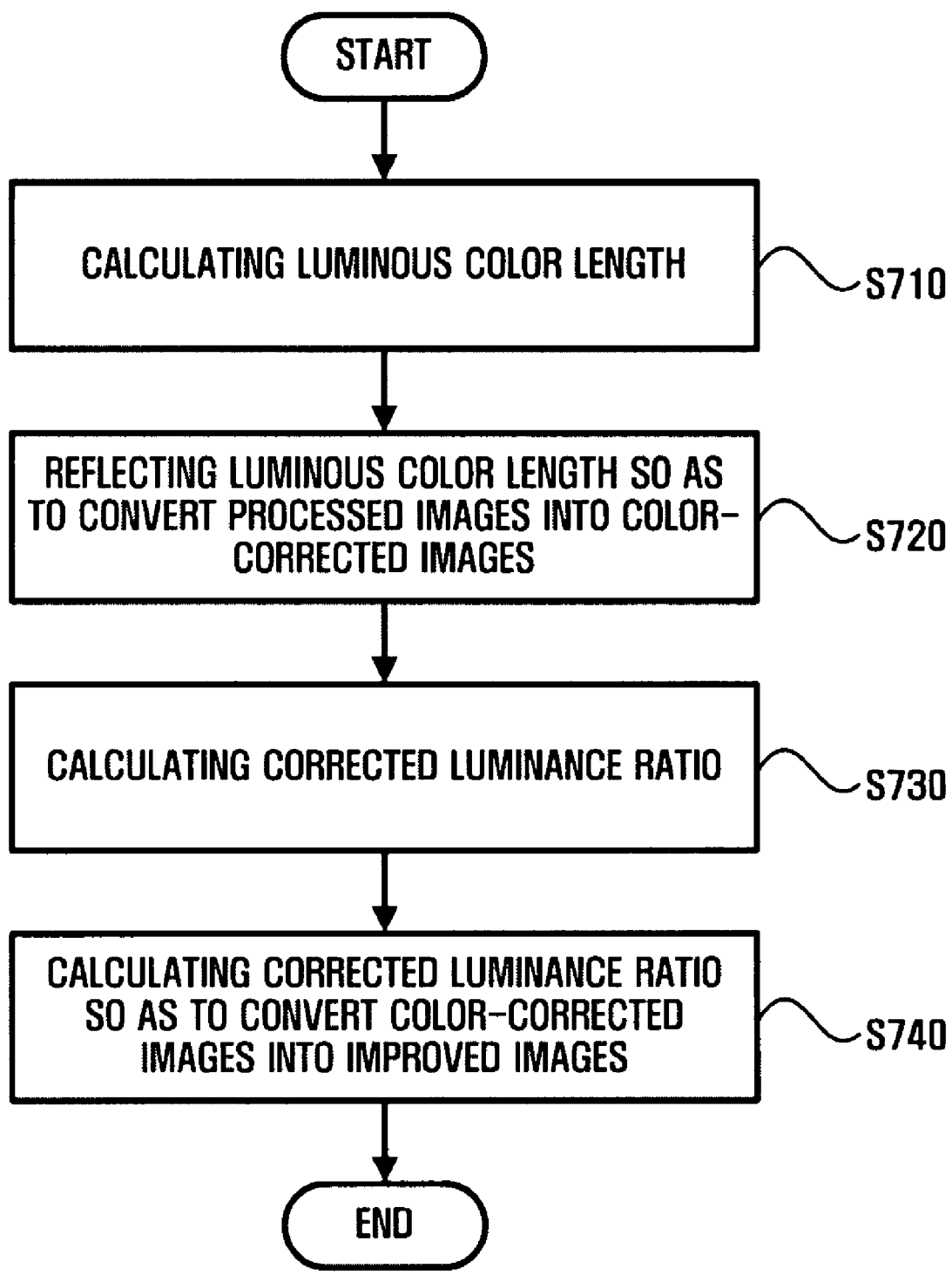
FIG. 7 is a flowchart illustrating a step S530 in FIG. 5.
Figure 8:
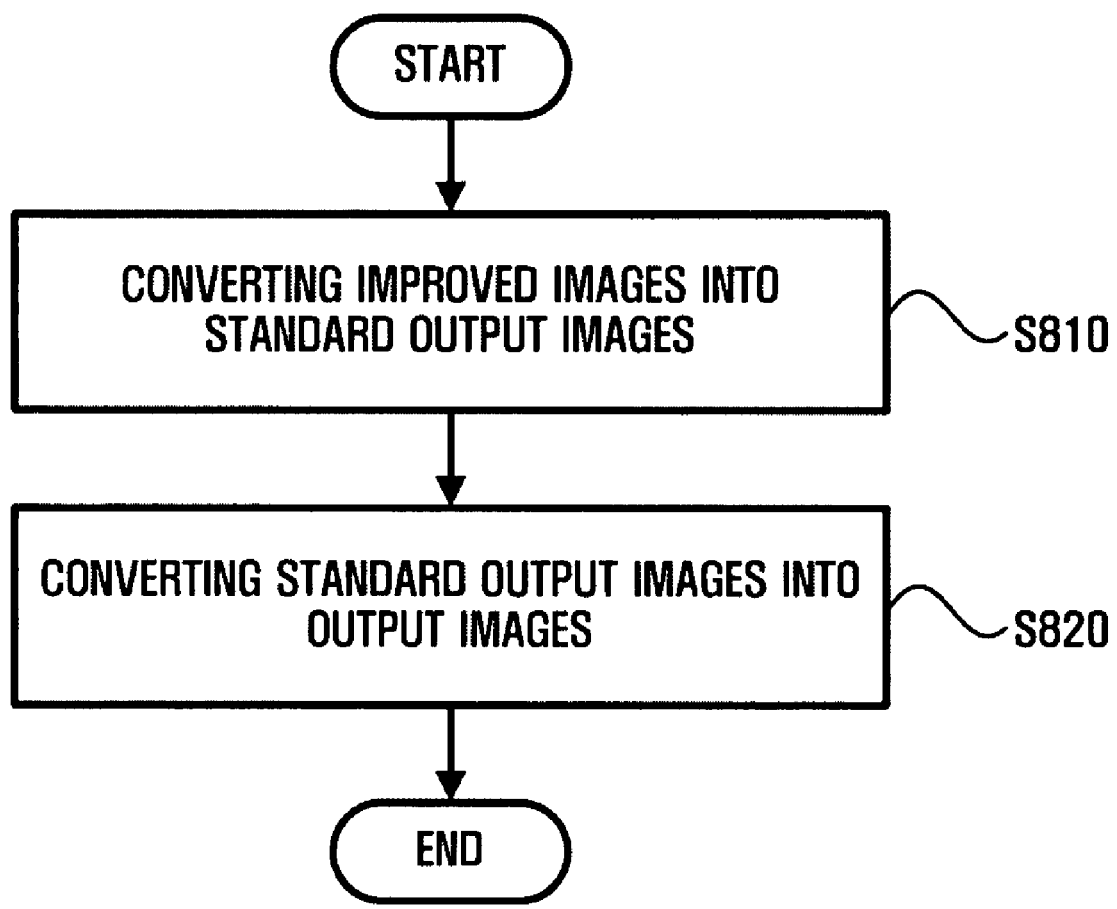
FIG. 8 is a flowchart illustrating a step S540 in FIG. 5.
Figure 9:
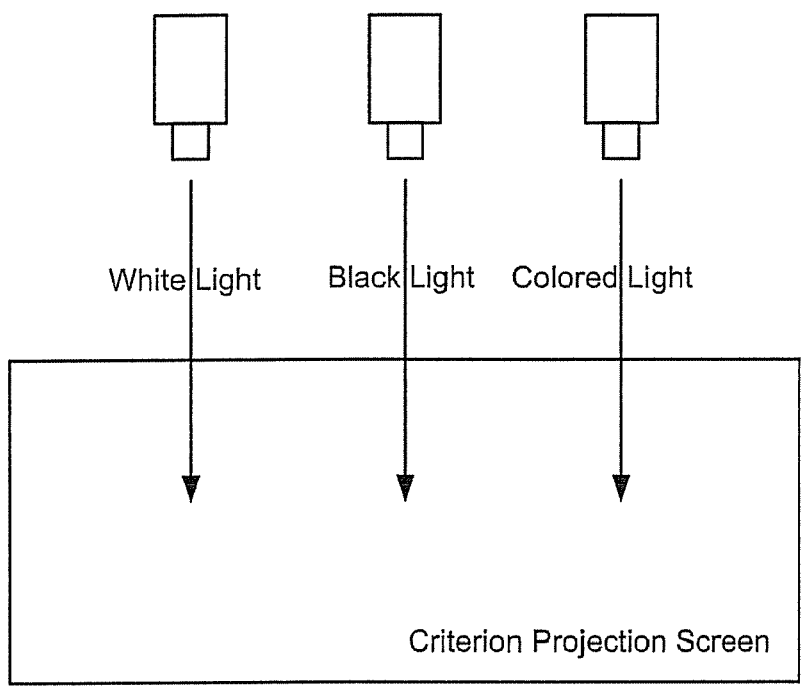
FIG. 9 is a block diagram illustrating projection of white light, black light, and colored light onto a criterion projection screen.
Figure 10:
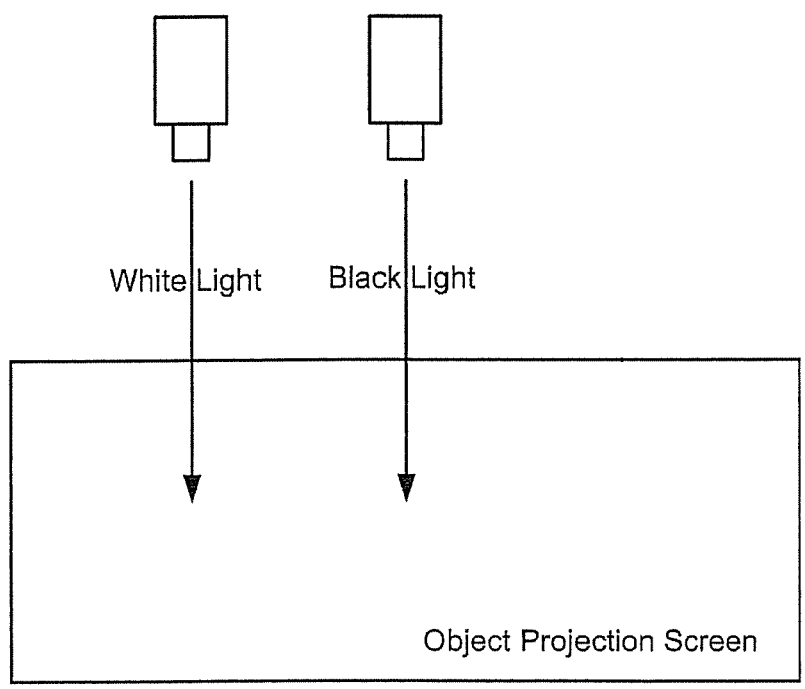
FIG. 10 is a block diagram illustrating projection of white light and black light onto an object projection screen.

FIGS. 6 to 8 are flowcharts illustrating image conversion carried out by means of the first image converter 120, the image improvement unit 140 and the second image converter 150 shown in FIG. 5. The image conversion will be described with reference to FIGS. 2 to 4 and 6 to 8 below.

First, the standard color space converter 210 receives the input images and the criterion projection characteristic information, and then reflects the received criterion projection characteristic information so as to convert the input images into the standard images (S610).

Here, the standard color space converter 210 receives the input images, criterion black light coordinate information and the criterion color matrix information, and substitutes $$\begin{pmatrix} X \\ Y \\ Z \end{pmatrix} = \begin{pmatrix} X \\ Y \\ Z \end{pmatrix}_{Black} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen} \begin{pmatrix} R \\ G \\ B \end{pmatrix}$$

with the criterion black light coordinate information and the criterion color matrix information, which are received, so as to covert the input images into the standard images.

Then, $$\begin{pmatrix} X \\ Y \\ Z \end{pmatrix}$$

is the coordinate value of the XYZ color space in the standard image, and $$\begin{pmatrix} R \\ G \\ B \end{pmatrix}$$

is the coordinate value of the RGB color space in the input images.

Next, the processed color space converter 220 receives the standard images and converts the received standard images into the processed images (S620).

Continuously, the luminous color length calculator 310 receives criterion projection characteristic information, object projection characteristic information, and a certain color length benefit, and then reflects the object projection characteristic information and the color length benefit so as to calculate the luminous color length (S710).

Here, the luminous color length calculator 310 receives the criterion white point equalization coordinate information, the object white point equalization coordinate information, and a certain color length benefit A, and then substitutes $x'_{wc}=A(x_{wc}-x_{wc})$, $y'_{wc}=A(y_{wc}-y_w)+y_w$ with the criterion white point equalization coordinate information, the object white point equalization coordinate information and the color length benefit, which are received, so as to calculate the luminous color length expressed by $(x'_{wc}, y'_{wc})$.

Here, the certain color length benefit is a real number which is no less than zero and no greater than one, and may be obtained based on user's recognition of the luminosity even though the user does not perform an undue experiment.

Then, the color correction unit 320 receives the luminous color length and the processed images, which in turn reflects the received luminous color length so as to convert the processed images into the color corrected images (S720).

Here, the color correction unit receives the luminous color length and the processed images and changes the white point of the processed images into the luminous color length, thereby converting the processed images into the color-corrected images.

Next, the luminance ratio calculator 330 receives the criterion projection characteristic information and the object projection characteristic information, and then reflects the criterion projection characteristic information and the object projection characteristic information to calculate the luminance ratio. The luminance ratio corrector 340 receives the luminance ratio and a brightness benefit, which is either a user's favorite brightness benefit input by the user or a selected brightness benefit, and then reflects the received brightness benefit so as to convert the received luminance ratio into the corrected luminance ratio (S730).

Here, the luminance calculator 330 receives the criterion luminance information and the object luminance information, and then calculates the ratio of the criterion luminance information to the object luminance information so as to create the luminance ratio. The luminance ratio corrector 340 receives the luminance ratio and the brightness benefit B, which is either user's favorite brightness benefit input by a user or a selected brightness benefit, and then substitutes $$x_c = B \frac{L_s}{L_c}$$

with the input brightness benefit and luminance ratio so as to obtain the corrected luminance ratio expressed by $x_c$.

Next, the brightness corrector 350 receives the corrected luminance ratio and the color-corrected images, and then reflects the corrected luminance ratio so as to convert the color-corrected images into the improved images (S740).

Here, the brightness corrector 350 receives the corrected luminance ratio and the color-corrected images, each of which the luminance element is $J_{in}$, and then reflects the corrected luminance ratio so as to convert the color-corrected images into the improved images each of which the luminous element is $$J_{out} = \begin{cases} \dfrac{x_c + J_2}{J_1} J_{in}, & \text{if } J_{in} \leq J_1 \\ \dfrac{100 - (x_c + J_2)}{100 - J_1}(J_{in} - 100) + 100, & \text{if } J_{in} > J_1 \end{cases}.$$

Then, the standard output image converter 410 receives and converts the improved images into the standard output images (S810).

Next, the output image converter 420 receives the standard output images, the criterion projection characteristic information and the object projection characteristic information, and then reflects the criterion projection characteristic information and the object projection characteristic information, which are received, so as to convert the standard output images into the output images (S820).

Here, the output image converter 420 receives the standard output images, the device color characteristic matrix information, the object white light standard color space coordinate information and the object black light standard color space coordinate information, and then substitutes $$\begin{pmatrix} X \\ Y \\ Z \end{pmatrix}_{\substack{White \\ color \\ wall}} = \begin{pmatrix} X \\ Y \\ Z \end{pmatrix}_{\substack{Black \\ color \\ wall}} + \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r \\ I_g \\ I_b \end{pmatrix}_{\substack{color \\ wall}}$$

with the object white light standard color space coordinate information and the object black light standard color space coordinate information, so as to obtain the coordinate values of the primary color intensities expressed by $$\begin{pmatrix} I_r \\ I_g \\ I_b \end{pmatrix}.$$

Continuously, the output image converter 420 substitutes $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{color \\ wall}} = \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r & 1 & 1 \\ 1 & I_g & 1 \\ 1 & 1 & I_b \end{pmatrix}_{\substack{color \\ wall}}$$

with the coordinate values of the primary color intensities and the device color characteristic matrix information to obtain the object color matrix information, and also substitutes $$\begin{pmatrix} X \\ Y \\ Z \end{pmatrix} = \begin{pmatrix} X \\ Y \\ Z \end{pmatrix}_{\substack{Black \\ color \\ wall}} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}} \begin{pmatrix} R' \\ G' \\ B' \end{pmatrix}$$

with the object color matrix information to convert the standard output images into the output images.

Here, $$\begin{pmatrix} X \\ Y \\ Z \end{pmatrix}$$

is a coordinate value of XYZ color space in the standard output images, and $$\begin{pmatrix} R' \\ G' \\ B' \end{pmatrix}$$

is a coordinate value of RGB in the output images.

In the apparatus and method for projecting images, considering a screen condition, according to the present invention, as described above, the projector can obtain and analyze information on colored projection screen, thereby preventing the distortion of projected images caused by the color of the projection screen.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for projecting images in consideration of a screen condition, the apparatus comprising:
   a device characteristic storage unit storing criterion projection characteristic information to be obtained when white light, black light and colored light are projected onto a criterion projection screen;
   a first image converter to convert received images into processed images by reflecting the criterion projection characteristic information to the received images;
   an image characteristic obtaining unit to obtain object projection characteristic information by projecting the white light and black light onto an object projection screen;
   an image improvement unit to convert the processed images into improved images by reflecting the object projection characteristic information to the processed images; and
   a second image converter to convert the improved images into output images by reflecting the criterion projection characteristic information and the object projection characteristic information to the improved images.

2. The apparatus of claim 1, wherein the first image converter comprises:
   a standard color space converter to reflect the criterion projection characteristic information to the received images so as to convert the received images into the standard images; and
   a color space converter to convert the standard images into the processed images.

3. The apparatus of claim 1, wherein the image improvement unit comprises:
   a luminous color length calculator to reflect the criterion projection characteristic information, the object projection characteristic information and a certain color length benefit, so as to calculate a luminous color length;
   a color corrector to reflect the luminous color length to the processed images so as to convert the processed images into color-corrected images;
   a luminance ratio calculator to calculate a luminance ratio with reference to the criterion projection characteristic information and the object projection characteristic information;
   a luminance ratio corrector to convert the luminance ratio into a corrected luminance ratio based on a preset brightness benefit; and
   a brightness corrector to reflect the corrected luminance ratio to the color-corrected images so as to convert the color-corrected images into improved images.

4. The apparatus of claim 1, wherein the second image converter comprises:
   a standard output image converter to convert the improved images into the standard output images; and
   an output image converter to reflect the criterion projection characteristic information and the object projection characteristic information to the standard output images so as to convert the standard output images into output images.

5. The apparatus of claim 1, wherein the criterion projection characteristic information comprises at least one of criterion white point equalization coordinate information, which is ($x_w$, $y_w$), criterion black light coordinate information, which is $$\begin{pmatrix} X \\ Y \\ Z \end{pmatrix}_{\substack{Black \\ White \\ Screen}},$$

criterion color matrix information, which is $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen},$$

matrix information on device color characteristic, which is $$\begin{pmatrix} \frac{x_r}{y_r} & \frac{x_g}{y} & \frac{x_b}{y_b} \\ 1 & 1 & 1 \\ \frac{z_r}{y_r} & \frac{z_g}{y_g} & \frac{z_b}{y_b} \end{pmatrix}_{projector},$$

and criterion luminance information $L_s$, and wherein ($x_w$, $y_w$) is a coordinate value of an equalized white point when white light is projected onto the screen, $$\begin{pmatrix} X \\ Y \\ Z \end{pmatrix}_{\substack{Black \\ White \\ Screen}}$$

is a XYZ coordinate value of a color space when black light is projected onto the screen, $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen}$$

is a matrix with respect to the maximum coordinate value of red light in the XYZ color space, the maximum coordinate value of blue light in the XYZ color space, and the maximum coordinate value of green light in the XYZ color, when the red light, blue light and green light with different intensities are projected onto a criterion screen.

$$\begin{pmatrix} \frac{x_r}{y_r} & \frac{x_g}{y} & \frac{x_b}{y_b} \\ 1 & 1 & 1 \\ \frac{z_r}{y_r} & \frac{z_g}{y_g} & \frac{z_b}{y_b} \end{pmatrix}_{projector}$$

is obtained by measuring colors and is a color characteristic matrix depending on a device, and Ls may be the luminance obtained when the white light is projected on a criterion screen.

6. The apparatus of claim 5, wherein the criterion color matrix information comprises XYZ values of primary colors which have the maximum tone curve value obtained by interpolating the primary colors to which images with different color intensities are reflected.

7. The apparatus of claim 5, wherein the objective projection characteristic information comprises at least one of object white point equalization coordinate information ($x_w$, $y_w$), coordinate information of object white light in a standard color space $$\begin{pmatrix} X \\ Y \\ Z \end{pmatrix}_{\substack{White \\ color \\ wall}},$$

coordinate information of object black light in a standard color space $$\begin{pmatrix} X \\ Y \\ Z \end{pmatrix}_{\substack{Black \\ color \\ wall}},$$

and object luminance information $L_c$, and wherein ($x_w$, $y_w$) may be an equalization coordinate value of the white point obtained by projecting the white color onto the object screen, $$\begin{pmatrix} X \\ Y \\ Z \end{pmatrix}_{\substack{white \\ color \\ wall}}$$

may be the coordinate value of the standard color space obtained by projecting the white light onto the object screen, $$\begin{pmatrix} X \\ Y \\ Z \end{pmatrix}_{\substack{Black \\ color \\ wall}}$$

may be the coordinate value of the standard color space obtained by projecting the black light onto the object screen, and $L_c$ may be the luminance information obtained by projecting the white light onto the object screen.

8. The apparatus of claim 5, wherein the first image converter substitutes $$\begin{pmatrix} X \\ Y \\ Z \end{pmatrix} = \begin{pmatrix} X \\ Y \\ Z \end{pmatrix}_{Black} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen} \begin{pmatrix} R \\ G \\ B \end{pmatrix}$$

with the received criterion black light coordinate information and the criterion color matrix information so as to convert the input images into the standard images, and wherein $$\begin{pmatrix} X \\ Y \\ Z \end{pmatrix}$$

may be a coordinate value of XYZ color space in the standard images, and $$\begin{pmatrix} R \\ G \\ B \end{pmatrix}$$

may be a coordinate value of RGB color space in the input images.

9. The apparatus of claim 7, wherein the image improvement unit comprises:
a luminous color length calculator to substitute $x'_{wc}=A(x_{wc}-x_w)$, $y'=A(y_{wc}-y_w)+y_w$ with the criterion white point equalization coordinate information, the object white point equalization coordinate information and a certain color length benefit so as to calculate a luminous color length expressed by $(x'_{wc}, y'_{wc})$;
a color corrector to change the white point of the processed images into the luminous color length, so as to convert the processed images into the color-corrected images;
a luminance ratio calculator to calculate the ratio of the object luminance information to the criterion luminance information, so as to obtain a luminance ratio;
a luminance ratio corrector to substitute $$x_c = B \frac{L_s}{L_c}$$

with the preset brightness benefit B and the luminance ratio $$\frac{L_s}{L_c},$$

so as to convert the luminance ratio into a corrected luminance ratio $x_c$; and
a brightness corrector to reflect the corrected luminance ratio to the color-corrected images each of which a luminance element is $J_{in}$ so as to convert the color-corrected images into improved images each of which the luminance element is $$J_{out} = \begin{cases} \dfrac{x_c + J_2}{J_1} J_{in}, & \text{if } J_{in} \leq J_1 \\ \dfrac{100 - (x_c + J_2)}{100 - J_1}(J_{in} - 100) + 100, & \text{if } J_{in} > J_1. \end{cases}$$

10. The apparatus of claim 7, wherein the second image converter comprises:
a standard output image converter to convert the improved images into standard output images; and
an output image converter to substitute $$\begin{pmatrix} X \\ Y \\ Z \end{pmatrix}_{White\ color\ wall} = \begin{pmatrix} X \\ Y \\ Z \end{pmatrix}_{Black\ color\ wall} + \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r \\ I_g \\ I_b \end{pmatrix}_{color\ wall}$$

with the device color characteristic matrix information, the object white light standard color space coordinate information and the object black light standard color space coordinate information, so as to obtain the coordinate values of the primary color intensities expressed by $$\begin{pmatrix} I_r \\ I_g \\ I_b \end{pmatrix},$$

substituting $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{color\ wall} = \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r & 1 & 1 \\ 1 & I_g & 1 \\ 1 & 1 & I_b \end{pmatrix}_{color\ wall}$$

with the coordinate values of the primary color intensities and the device color characteristic matrix information to obtain the object color matrix information, and substituting $$\begin{pmatrix} X \\ Y \\ Z \end{pmatrix} = \begin{pmatrix} X \\ Y \\ Z \end{pmatrix}_{Black\ color\ wall} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{white\ screen} \begin{pmatrix} R' \\ G' \\ B' \end{pmatrix}$$

with the object color matrix information to convert the standard output images into the output images, and wherein $$\begin{pmatrix} X \\ Y \\ Z \end{pmatrix}$$

is a coordinate value of XYZ color space in the standard output images, and $$\begin{pmatrix} R' \\ G' \\ B' \end{pmatrix}$$

is a coordinate value of RGB in the output images.

11. A method of projecting images in consideration of a projection screen, the method comprising:
   (a) converting received images into processed images when white light, black light and colored light are projected on a criterion projection screen by reflecting obtained criterion projection characteristic information to the received images;
   (b) obtaining object projection characteristic information by projecting the white light and black light on an object projection screen;
   (c) converting the processed images into improved images by reflecting the object projection characteristic information to the processed images; and
   (d) converting the improved images into output images by reflecting the criterion projection characteristic information and the object projection characteristic information to the improved images.

12. The method of claim 11, wherein step (a) comprises:
   reflecting the criterion projection characteristic information on the received images; and
   converting the standard images into the processed images.

13. The method of claim 11, wherein step (c) comprises:
   reflecting the criterion projection characteristic information, the object projection characteristic information and a certain color length benefit, so as to calculate a luminous color length;
   reflecting the processed images to the luminous color length, so as to convert the processed images into color-corrected images;
   calculating a luminance ratio of the received images with reference to the criterion projection characteristic information and the object projection characteristic information;
   converting the luminance ratio into corrected luminance ratio based on a preset brightness benefit; and
   reflecting the corrected luminance ratio to the color-corrected images so as to convert the color-corrected images into improved images.

14. The method of claim 11, wherein step (d) comprises:
   converting the improved images into standard output images; and
   reflecting the criterion projection characteristic information and the object projection characteristic information to the standard output images, so as to convert the standard output images into output images.

15. The method of claim 11, wherein the criterion projection characteristic information comprises at least one of criterion white point equalization coordinate information which is $(x_w, y_w)$, criterion black light coordinate information which is $$\begin{pmatrix} X \\ Y \\ Z \end{pmatrix}_{\substack{Black \\ White \\ Screen}},$$

criterion color matrix information, which is $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}},$$

matrix information on device color characteristic, which is $$\begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector},$$

and criterion luminance information $L_s$, and wherein $(x_w, y_w)$ is a coordinate value of an equalized white point when white light is projected onto the screen, $$\begin{pmatrix} X \\ Y \\ Z \end{pmatrix}_{\substack{Black \\ White \\ Screen}}$$

is a XYZ coordinate value of a color space when black light is projected onto the screen, $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}}$$

is a matrix with respect to the maximum coordinate value of red light in the XYZ color space, the maximum coordinate value of blue light in the XYZ color space, and the maximum coordinate value of green light in the XYZ color when the red light, blue light and green light with different intensities are alternately projected on a criterion screen.

$$\begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector}$$

is obtained by measuring colors, and is a color characteristic matrix depending on a device, and Ls may be the luminance obtained when the white light is projected onto a criterion screen.

16. The method of claim 15, wherein the criterion color matrix information comprises XYZ values of primary colors which have the maximum tone curve value obtained by interpolating the primary colors to which images with different color intensities are reflected.

17. The method of claim 15, wherein the object projection characteristic information comprises at least one of object white point equalization coordinate information $(x_w, y_w)$, coordinate information of object white light in a standard color space $$\begin{pmatrix} X \\ Y \\ Z \end{pmatrix}_{\substack{White \\ color \\ wall}},$$

coordinate information of object black light in a standard color space $$\begin{pmatrix} X \\ Y \\ Z \end{pmatrix}_{\substack{Black \\ color \\ wall}},$$

and object luminance information $L_c$, and wherein $(x_w, y_w)$ may be an equalization coordinate value of the white point obtained by projecting the white color on the object screen, $$\begin{pmatrix} X \\ Y \\ Z \end{pmatrix}_{\substack{white \\ color \\ wall}}$$

may be the coordinate value of the standard color space obtained by projecting the white light on the object screen, $$\begin{pmatrix} X \\ Y \\ Z \end{pmatrix}_{\substack{Black \\ color \\ wall}}$$

may be the coordinate value of the standard color space obtained by projecting the black light, and $L_c$ may be the luminance information obtained by projecting the white light on the object screen.

18. The method of claim 15, wherein step (a) comprises substituting $$\begin{pmatrix} X \\ Y \\ Z \end{pmatrix} = \begin{pmatrix} X \\ Y \\ Z \end{pmatrix}_{Black} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}} \begin{pmatrix} R \\ G \\ B \end{pmatrix}$$

with the received criterion black light coordinate information and the criterion color matrix information, so as to convert the received images into the standard images, in which $$\begin{pmatrix} X \\ Y \\ Z \end{pmatrix}$$

may be a coordinate value of XYZ color space in the standard images, and $$\begin{pmatrix} R \\ G \\ B \end{pmatrix}$$

be a coordinate value of RGB color space in the input images.

19. The method of claim 17, wherein step (c) comprises:
substituting $x'_{wc}=A(x_{wc}-x_w)$, $y'=A(y_{wc}-y_w)+y_w$ with the criterion white point equalization coordinate information, the object white point equalization coordinate information and a certain color length benefit, so as to calculate a luminous color length expressed by $(x'_{wc}, y'_{wc})$;

changing white point of the processed images into the luminous color length so as to convert the processed images into the color-corrected images;

calculating the ratio of the object luminance information to the criterion luminance information, so as to obtain a luminance ratio;

substituting $$x_c = B \frac{L_s}{L_c}$$

with the preset brightness benefit B and the luminance ratio $$\frac{L_s}{L_c},$$

so as to convert the luminance ratio into a corrected luminance ratio $x_c$; and reflecting the corrected luminance ratio to the color-corrected images, each of which a luminance element is $J_{in}$, so as to convert the color-corrected images into improved images, each of which the luminance element is $$J_{out} = \begin{cases} \dfrac{x_c + J_2}{J_1} J_{in}, & \text{if } J_{in} \leq J_1 \\ \dfrac{100 - (x_c + J_2)}{100 - J_1}(J_{in} - 100) + 100, & \text{if } J_{in} > J_1 \end{cases}.$$

20. The method of claim 17, wherein step (d) comprises:
converting the improved images into standard output images;
substituting $$\begin{pmatrix} X \\ Y \\ Z \end{pmatrix}_{\substack{White \\ color \\ wall}} = \begin{pmatrix} X \\ Y \\ Z \end{pmatrix}_{\substack{Black \\ color \\ wall}} + \begin{pmatrix} \dfrac{x_r}{y_r} & \dfrac{x_g}{y_g} & \dfrac{x_b}{y_b} \\ 1 & 1 & 1 \\ \dfrac{z_r}{y_r} & \dfrac{z_g}{y_g} & \dfrac{z_b}{y_b} \end{pmatrix}_{projector} \begin{pmatrix} I_r \\ I_g \\ I_b \end{pmatrix}_{\substack{color \\ wall}}$$

with the device color characteristic matrix information, the object white light standard color space coordinate information and the object black light standard color space coordinate information, so as to obtain the coordinate values of the primary color intensities expressed by $$\begin{pmatrix} I_r \\ I_g \\ I_b \end{pmatrix};$$

substituting $$\begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{color \\ wall}} = \begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}_{projector} \begin{pmatrix} I_r & 1 & 1 \\ 1 & I_g & 1 \\ 1 & 1 & I_b \end{pmatrix}_{\substack{color \\ wall}}$$

with the coordinate values of the primary color intensities and the device color characteristic matrix information to obtain the object color matrix information; and substituting $$\begin{pmatrix} X \\ Y \\ Z \end{pmatrix} = \begin{pmatrix} X \\ Y \\ Z \end{pmatrix}_{\substack{Black \\ color \\ wall}} + \begin{pmatrix} X_{R,max} & X_{G,max} & X_{B,max} \\ Y_{R,max} & Y_{G,max} & Y_{B,max} \\ Z_{R,max} & Z_{G,max} & Z_{B,max} \end{pmatrix}_{\substack{white \\ screen}} \begin{pmatrix} R' \\ G' \\ B' \end{pmatrix}$$

with the object color matrix information to convert the standard output images into the output images, and wherein $$\begin{pmatrix} X \\ Y \\ Z \end{pmatrix}$$

is a coordinate value of XYZ color space in the standard output images, and $$\begin{pmatrix} R' \\ G' \\ B' \end{pmatrix}$$

is a coordinate value of RGB in the output images.

\* \* \* \* \*

UNITED STATES PATENT AND TRADEMARK OFFICE
CERTIFICATE OF CORRECTION

PATENT NO. : 7,866,833 B2  
APPLICATION NO. : 11/882727  
DATED : January 11, 2011  
INVENTOR(S) : Yousun Bang et al.

Page 1 of 1

It is certified that error appears in the above-identified patent and that said Letters Patent is hereby corrected as shown below:

Column 15, Line 4, In Claim 5, delete "($x_w y_w$)," and insert --($x_w, y_w$),-- , therefor.

Column 15, Line 30-34 (Approx.), In Claim 5, delete "$\begin{pmatrix} \frac{x_r}{y_r} & \frac{x_g}{y} & \frac{x_b}{y_b} \\ 1 & 1 & 1 \\ \frac{z_r}{y_r} & \frac{z_g}{y_g} & \frac{z_b}{y_b} \end{pmatrix}_{projector}$ ,"

and insert --$\begin{pmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{pmatrix}$-- , therefor.

Column 15, Line 67, In Claim 5, delete "screen." and insert --screen,-- , therefor.

Signed and Sealed this  
Twelfth Day of June, 2012

David J. Kappos  
*Director of the United States Patent and Trademark Office*